United States Patent
Nakamura

(10) Patent No.: US 8,045,349 B2
(45) Date of Patent: Oct. 25, 2011

(54) CHARGE PUMP-TYPE DC/DC CONVERTER

(75) Inventor: Munenori Nakamura, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 709 days.

(21) Appl. No.: 11/875,036

(22) Filed: Oct. 19, 2007

(65) Prior Publication Data

US 2008/0116960 A1    May 22, 2008

(30) Foreign Application Priority Data

Nov. 22, 2006  (JP) ................... 2006-315287

(51) Int. Cl.
*H02M 3/07* (2006.01)
(52) U.S. Cl. .................. 363/60; 327/536; 327/537
(58) Field of Classification Search .......... 327/536, 327/537; 363/59–60; 257/299; 307/110
See application file for complete search history.

(56) References Cited

U.S. PATENT DOCUMENTS

| 6,172,886 | B1 | 1/2001 | Lauterbach et al. |
| 6,177,829 | B1* | 1/2001 | Jones et al. ................... 327/536 |
| 6,278,318 | B1 | 8/2001 | Watanabe |
| 6,535,052 | B2* | 3/2003 | Myono ........................ 327/536 |
| 7,183,837 | B2* | 2/2007 | Fujiwara ...................... 327/537 |
| 2005/0213356 | A1 | 9/2005 | Yanagida et al. |
| 2007/0194834 | A1* | 8/2007 | Sohara et al. ................. 327/536 |

FOREIGN PATENT DOCUMENTS

| JP | 2000500960 | 1/2000 |
| JP | 2000236658 | 8/2000 |
| JP | 2005278356 | 6/2005 |

* cited by examiner

*Primary Examiner* — Harry Behm
(74) *Attorney, Agent, or Firm* — Volentine & Whitt, PLLC

(57) ABSTRACT

A charge pump-type DC/DC converter is provided that steadily operates even when boosting reference voltage is low. A PMOS transistor for short-circuiting an output terminal of a charge pump of an initial stage with a booster reference voltage is provided to eliminate the influence of a parasitic diode of a PMOS transistor within the charge pump of the initial stage during build-up. The PMOS transistor is controlled by the voltage of another charge pump and the short-circuit described above is released by the increase of the output voltage of the other charge pump.

4 Claims, 13 Drawing Sheets

CHARGE PUMP-TYPE DC/DC CONVERTER

CROSS-REFERENCE TO RELATED APPLICATION

This application claims priority under 35 USC 119 from Japanese Patent Application No. 2006-315287, the disclosure of which is incorporated by reference herein.

BACKGROUND OF THE INVENTION

1. Field of the Invention

The present invention relates to a technology for attaining stable operation of a charge pump-type DC/DC converter.

2. Description of the Related Art

A multi-output charge pump-type DC/DC converter is known, as disclosed in Japanese Patent Application Laid-Open (JP-A) No. 2005-278356, for example. This kind of charge pump-type DC/DC converter has a structure in which a plurality of stages of charge pumps is connected in series.

The conventional charge pump-type DC/DC converter generates a driving signal of the first stage charge pump by shifting the level of the power-supply voltage VDD by the output voltage of the first stage charge pump.

However, a problem has often occurred in the conventional charge pump-type DC/DC converter whereby the output voltage (initial value) of the first stage charge pump does not rise to the operating voltage of a level shifter when building up the DC/DC converter due to a parasitic diode of a transistor within the charge pump, thus generating no driving signal. This problem is particularly pronounced when the voltage (reference voltage) that is the basis of boosting is low.

Accordingly, a charge pump-type DC/DC converter that steadily operates even when the reference voltage is low is required.

SUMMARY OF THE INVENTION

The present invention has been made in view of the above circumstances and provides a charge pump-type DC/DC converter.

An aspect of the present invention provides a charge pump-type DC/DC converter that includes a plurality of stages of charge pumps connected in series, wherein a charge pump in each stage outputs a voltage that is a reference voltage multiplied by a plurality of times and includes a capacitor that alternately repeats a charging period and a boosting period, a first transistor that turns ON during the charging period and turns OFF during the boosting period, and a second transistor that turns OFF during the charging period and turns ON during the boosting period, a driving circuit, operated by a first output voltage of a first charge pump of an initial stage, that generates driving signals for driving the first and the second transistors within the first charge pump, and a third transistor that turns ON when a second charge pump, which is any one of the charge pumps at or after a second stage, is low to provide the reference voltage to a first output terminal of the first charge pump, and turns OFF when the second output voltage is high to shut down the reference voltage from the first output terminal.

The charge pump-type DC/DC converter of the invention operates as follows.

That is, the third transistor turns ON and the reference voltage is provided to the first output terminal of the first charge pump of the initial stage because the second output voltage of the second charge pump is low during the build-up time. Accordingly, the driving circuit starts to operate and generate the driving signals by this reference voltage. The driving signals are provided to the first and second transistors within the first charge pump of the initial stage and the first charge pump of the initial stage starts its operation. Along with the operation of this first charge pump, the first output voltage of the first charge pump increases. Then, along with the increase of the first output voltage, any one of the charge pumps at or after a second stage also starts its operation. When its second output voltage increases, the third transistor turns OFF and the first output terminal of the first charge pump of the initial stage is shut down from the reference voltage.

The initial value of the first output voltage is the reference voltage in the charge pump-type DC/DC converter of the invention during the build-up time. The initial value of the first output voltage will not drop by being influenced by the parasitic diode of the first and second transistors.

Accordingly, the charge pump-type DC/DC converter of the invention steadily operates even when the boosting reference voltage is low.

BRIEF DESCRIPTION OF THE DRAWINGS

Preferred exemplary embodiments of the present invention will be described in detail based on the following figures wherein.

DETAILED DESCRIPTION OF THE INVENTION

<Reference Device>

Before explaining the exemplary embodiments of the invention, a reference device having a similar structure with the exemplary embodiments will be explained for the convenience of understanding of the exemplary embodiments. It is noted that reference level of voltage will be VSS in the following description unless specified otherwise.

—Structure of the Reference Device—

Figure 1:
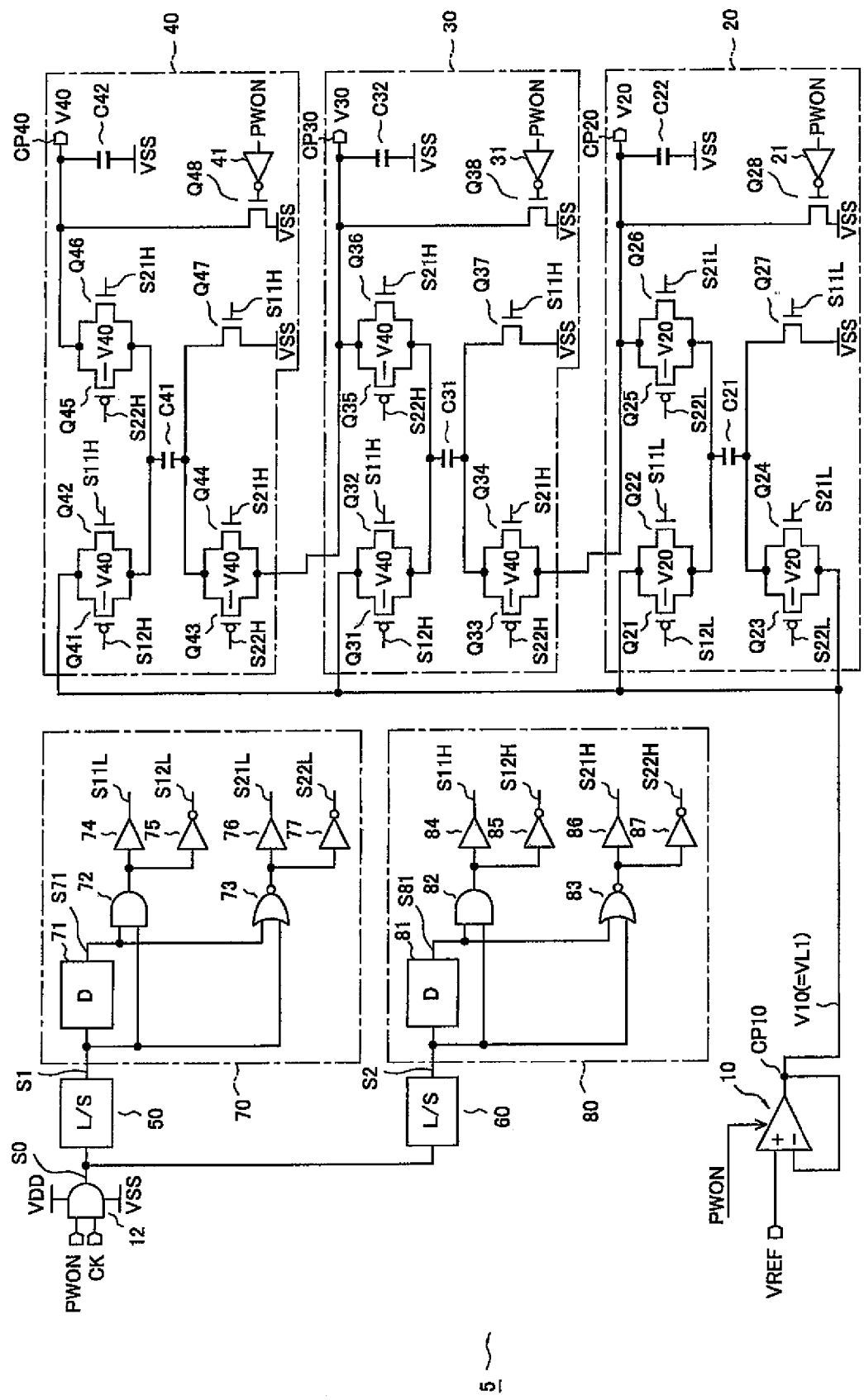
FIG. 1 is a circuit diagram of a DC/DC converter illustrated as a reference device.

The structure of the DC/DC converter 5 illustrated as the reference device will be explained with reference to FIG. 1. FIG. 1 is a circuit diagram of the DC/DC converter 5. In FIG. 1, charge pumps 20 through 40 of plural stages are connected in series in the DC/DC converter 5 and are arranged so as to output, as compared to voltage VL1, voltages of twice (V2), three times (VL3) and four times (VL4), respectively, during a normal operation (operations after an elapse of a build-up period). That is, the charge pump of the initial stage is the charge pump 20 and the charge pump of the final stage is the charge pump 40 in this DC/DC converter 5. It is noted that in FIG. 1, a PWON (power-on) signal is always at high level (on a level H) after when the DC/DC converter 5 is activated.

An operational amplifier 10 operates when the PWON signal is on the level H. It receives reference voltage VREF (same value with the voltage VL1) through a non-inverting input terminal (+). An inverting input terminal (−) thereof is short-circuited with an output terminal thereof. That is, the operational amplifier 10 composes a voltage buffer and outputs a signal of the reference voltage VREF by converting impedance thereof. The output voltage V10 of the operational amplifier 10 quickly reaches to the voltage VL1 after when the DC/DC converter 5 is activated. The output voltage V10 of the operational amplifier 10 is supplied to each of the charge pumps 20 through 40 of the plurality of stages. It is noted that the voltage VL1 will be also denoted appropriately as "reference voltage" hereinafter.

A gate circuit 12 is connected with VDD (power-supply voltage) and VSS and operates corresponding to logical levels of the PWON signal and the clock signal CK. That is, the gate circuit 12 outputs the VDD when the PWON signal and the clock signal CK are both on the level H and outputs the VSS when either one of the PWON signal and the clock signal CK is at low level (on a level L). Accordingly, an output signal S0 of the gate circuit 12 repeats the levels H and L in the same timing with the clock signal CK and its amplitude voltage turns out to be the VDD after when the DC/DC converter 5 is activated.

—Structure of Level Shifter and Normal Operation—

A level shifter 50 shifts the level of the maximum voltage (VDD) of the signal S0 to that of the output voltage V20 of the charge pump 20. At a point of time when the operation of the DC/DC converter 5 is stabilized after an elapse of a certain period of time since the activation of the DC/DC converter 5, the output voltage V20 of the charge pump 20 turns out to be the voltage VL2 (=VL1×2). At this time, the output signal S1 of the level shifter 50 repeats the levels H and L in the same timing with the clock signal CK and the amplitude voltage turns out to be VL2.

Figure 2:
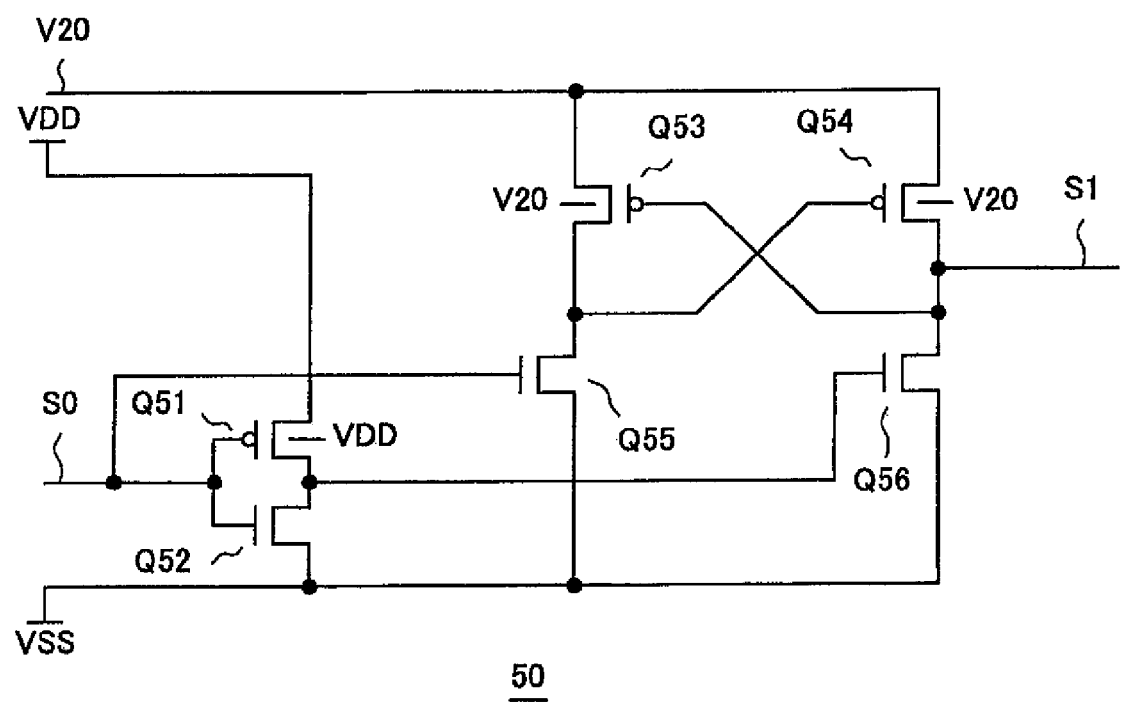
FIG. 2 is a diagram showing an exemplary circuit structure of a level shifter.

FIG. 2 is a diagram showing an exemplary circuit structure of the level shifter 50. The level shifter 50 shown in FIG. 2 has a PMOS transistor Q51 and a NMOS transistor Q52 composing an inverter, PMOS transistors Q53 and Q54 and NMOS transistors Q55 and 56.

In the level shifter 50, the signal S0 is provided to a gate of the NMOS transistor Q55 and an inverted signal of the signal S0 is provided to a gate of the NMOS transistor Q56. The output voltage V20 of the charge pump 20 is provided to sources of the PMOS transistors Q53 and Q54. A gate of the PMOS transistor Q53 is connected with a drain of the NMOS transistor Q56. A gate of the PMOS transistor Q54 is connected with a drain of the NMOS transistor Q55. The VSS is provided to sources of the NMOS transistors Q55 and Q56.

Because the NMOS transistor Q55 and the PMOS transistor Q54 turn ON when the signal S0 is on the level H (VDD) in the level shifter 50, an output signal S1 turns to the level H (voltage V20). The NMOS transistor Q56 turns OFF at this time, so that an output line of the output signal S1 is shut down from the VSS.

When the signal S0 is on the level L (GND) in contrary, the NMOS transistor Q56 turns ON and the output signal S1 turns to the level L (VSS). The PMOS transistor Q53 turns ON at this time, so that the PMOS transistor Q54 turns OFF, shutting down the signal line of the output signal S1 from the voltage V20.

Accordingly, the output signal S1 of the level shifter 50 repeats the levels H and L in synchronism with the signal S0, i.e., the clock signal CK, and its amplitude voltage turns out to be the V20.

A level shifter 60 shifts the level of the maximum voltage (VDD) of the signal S0 to the output voltage V40 (second output voltage) of the charge pump 40. At a point of time when the operation of the DC/DC converter 5 is stabilized after an elapse of a certain period of time since the activation of the DC/DC converter 5, the output voltage V40 of the charge pump 40 turns out to be the voltage VL4 (=VL1×4). At this time, the output signal S2 of the level shifter 60 repeats the levels H and L in the same timing with the clock signal CK and its amplitude voltage turns out to be VL4.

Figure 3:
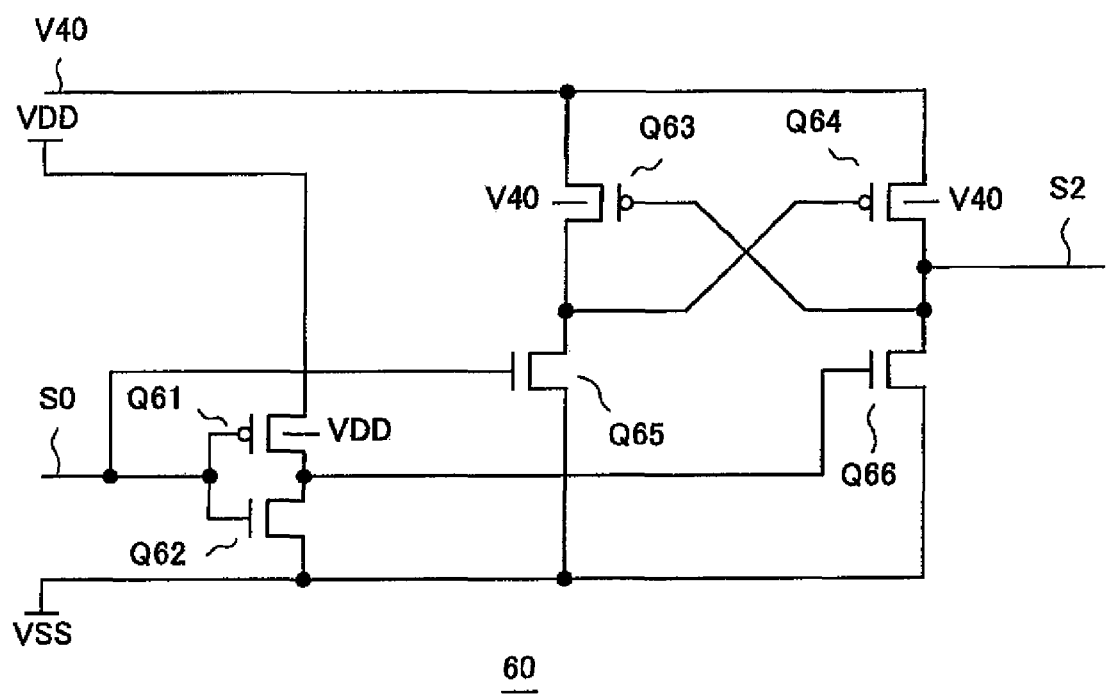
FIG. 3 is a diagram showing an exemplary circuit structure of another level shifter.

FIG. 3 is a diagram showing an exemplary circuit structure of the level shifter 60. The level shifter 60 shown in FIG. 3 has a PMOS transistor Q61 and a NMOS transistor Q62 composing an inverter, PMOS transistors Q63 and Q64 and NMOS transistors Q65 and Q66.

In the level shifter 60, the signal S0 is provided to a gate of the NMOS transistor Q65 and an inverted signal of the signal S0 is provided to a gate of the NMOS transistor Q66. The output voltage V40 of the charge pump 40 is provided to sources of the PMOS transistors Q63 and Q64. A gate of the PMOS transistor Q63 is connected with a drain of the NMOS transistor Q66. A gate of the PMOS transistor Q64 is connected with a drain of the NMOS transistor Q65. A gate of the PMOS transistor Q64 is connected with a drain of the NMOS transistor Q65. The VSS is provided to sources of the NMOS transistors Q65 and Q66.

Because the NMOS transistor Q65 and the PMOS transistor Q64 turn ON when the signal S0 is on the level H (VDD) in the level shifter 60, an output signal S2 turns to the level H (voltage V40). The NMOS transistor Q66 turns OFF at this time, so that an output line of the output signal S2 is shut down from the VSS.

When the signal S0 is on the level L (GND) in contrary, the NMOS transistor Q66 turns ON and the output signal S2 turns to the level L (VSS). The PMOS transistor Q63 turns ON at this time, so that the PMOS transistor Q64 turns OFF and the signal line of the output signal S2 is shut down from the output voltage V40.

Accordingly, the output signal S2 of the level shifter 60 repeats the levels H and L in synchronism with the signal S0, i.e., the clock signal CK, and its amplitude voltage turns out to be the V40.

—Structure of the Driving Circuit and Normal Operation—

A driving circuit 70 generates driving signals for driving the charge pump 20. That is, the charge pump 20 operates so as to alternately repeat charging and boosting periods by signals S11L, S12L, S21L and S22L generated by the driving circuit 70.

The driving circuit 70 has a delay circuit 71, an AND circuit 72, a NOR circuit 73, buffers 74 and 76 and inverters 75 and 77 as shown in FIG. 1. The delay circuit 71 generates a signal S71 that is delayed by a predetermined period Δt from the signal S1 from the level shifter 50. The AND circuit 72 performs an AND operation of the signal S1 and the signal S71. The NOR circuit 73 performs a NOR operation of the signal S71 and the signal S1. It is noted that the driving circuit 70 operates by the output voltage V20 as the power-supply voltage and is composed of the transistors whose operating threshold is low.

Figure 4:
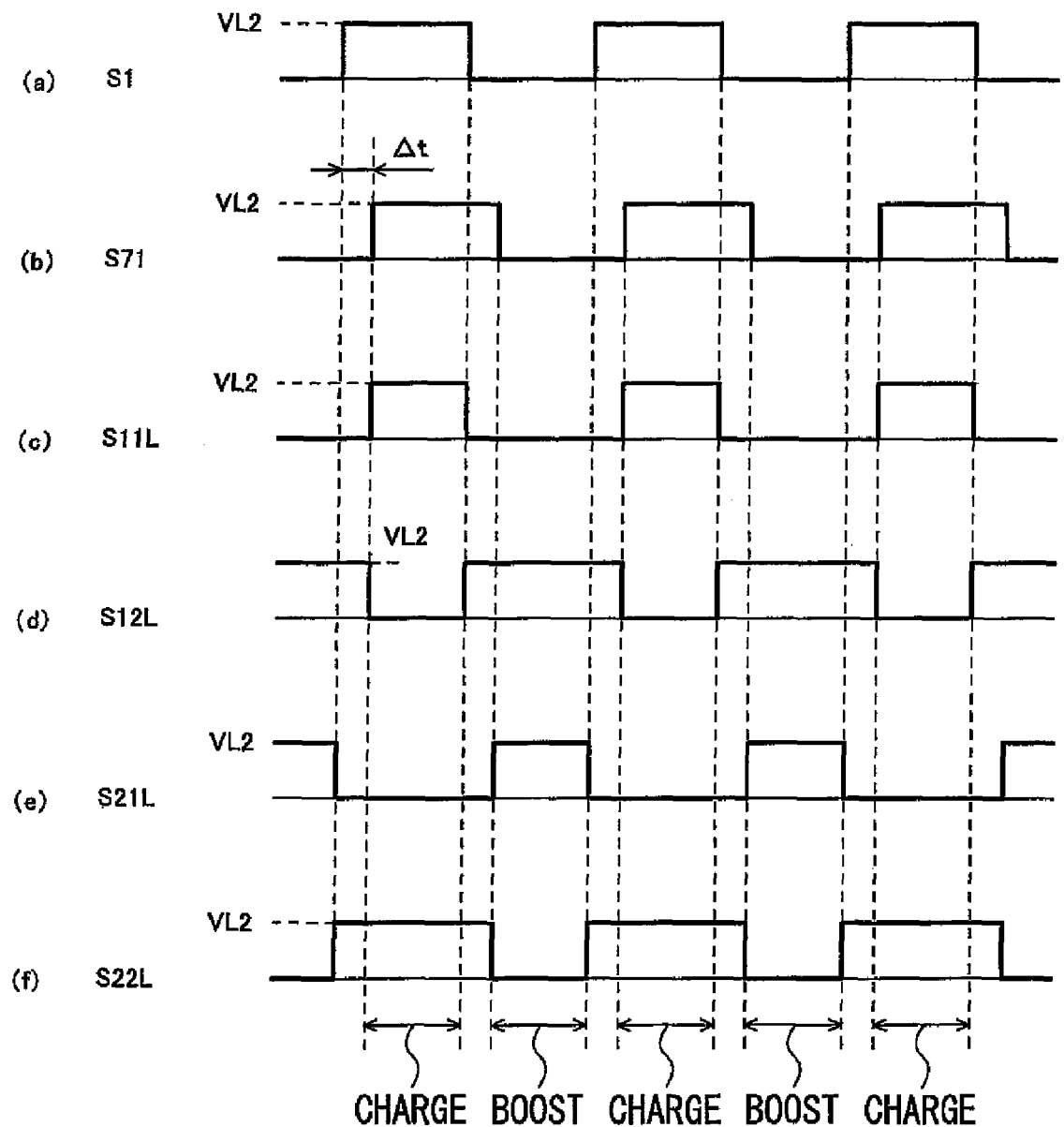
FIG. 4 is a timing chart illustrating normal operations of a driving circuit.

FIG. 4 is a timing chart illustrating normal operations of the driving circuit 70 shown in FIG. 1, indicating signal waveforms of (a) the signal S1, (b) the signal S71, (c) the signal S11L, (d) the signal S12L, (e) the signal S21L and (f) the signal S22, respectively, in a time series manner. In FIG. 4, periods during which the signal S11L is on the level H (VL2) (periods during which the signal S12L is on the level L (VSS)) are charging periods of the charge pump 20, and periods during which the signal S21L is on the level H (VL2) (periods during which the signal S22L is on the level L (VSS)) are boosting periods of the charge pump 20.

A driving circuit 80 generates driving signals for driving the charge pumps 30 and 40. That is, the charge pumps 30 and 40 operate so as to alternately repeat charging and boosting periods by signals S11H, S12H, S21H and S22H generated by the driving circuit 80.

The driving circuit 80 has a delay circuit 81, an AND circuit 82, a NOR circuit 83, buffers 84 and 86 and inverters 85 and 87 as shown in FIG. 1. The delay circuit 81 generates a signal S81 that is delayed by a predetermined period Δt from the signal S2 from the level shifter 60. The AND circuit 82 performs an AND operation of the signal S2 and the signal S81. The NOR circuit 83 performs a NOR operation of the signal S81 and the signal S2. It is noted that the driving circuit 80 operates by the output voltage V40 as the power-supply voltage and is composed of transistors whose operating threshold is high by taking withstanding voltage into account.

Figure 5:
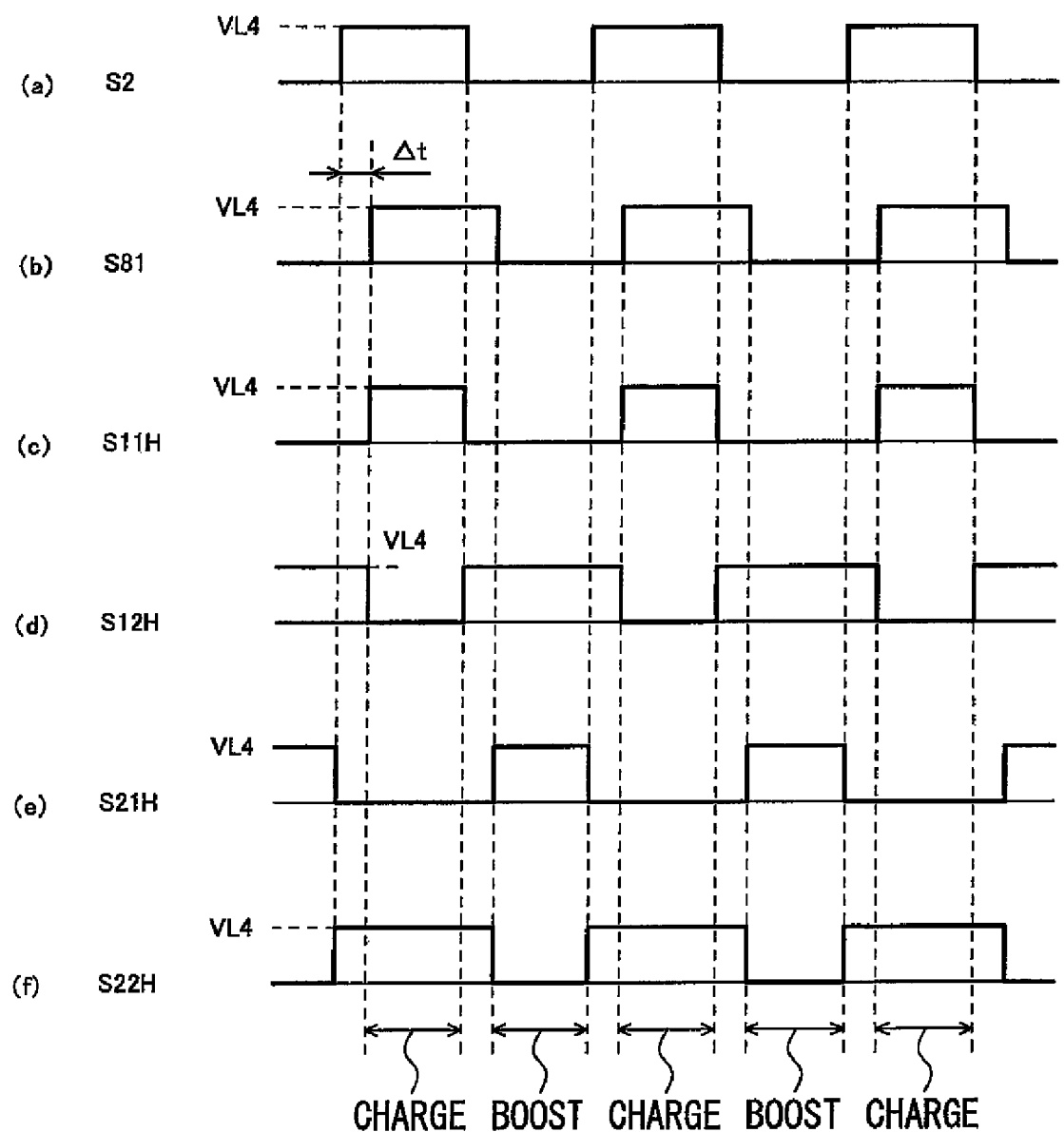
FIG. 5 is another timing chart illustrating normal operations of the driving circuit.

FIG. 5 is a timing chart illustrating normal operations of the driving circuit 80 shown in FIG. 1, indicating signal waveforms of (a) the signal S2, (b) the signal S81, (c) the signal S11H, (d) the signal S12H, (e) the signal S21H and (f) the signal S22H, respectively, in a time series manner. In FIG. 5, periods during which the signal S11H is on the level H (VL4) (periods during which the signal S12H is on the level L (VSS)) are charging periods of the charge pumps 30 and 40, and periods during which the signal S21H is on the level H (VL4) periods during which the signal S22H is on the level L (VSS)) are boosting periods of the charge pumps 30 and 40.

—Structure of the Charge Pump 20 and Normal Operation—

The charge pump 20 is a circuit for boosting the output voltage V10 (=VL1) of the operational amplifier 10 by two times to the voltage VL2.

As shown in FIG. 1, the charge pump 20 has a PMOS transistor Q21 and a NMOS transistor Q22 that operate in a pair, a PMOS transistor Q25 and a NMOS transistor Q26 that operate in a pair, a PMOS transistor Q23 and a NMOS transistor Q24 that operate in a pair, NMOS transistors Q27 and Q28, an inverter 21, a capacitor C21 for performing charging and boosting operations and a capacitor C22, connected to an output terminal CP20 (first output terminal), for stabilizing the circuit.

Figure 6:
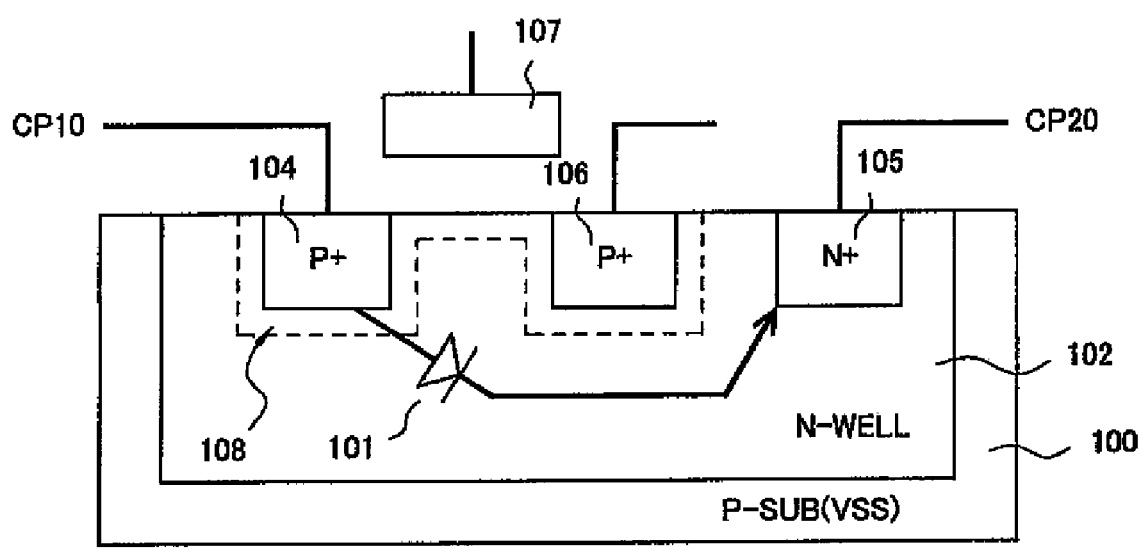
FIG. 6 is a section view of a structure of a PMOS transistor within a charge pump.

FIG. 6 is a section view of a structure of the PMOS transistor Q21 (the same applies also to the PMOS transistor Q23). As shown in FIG. 6, the PMOS transistor Q21 is formed in a N-well region 102 within a P-type substrate 100 (VSS level). A P-type impurity region 104 (source) and a P-type impurity region 106 (drain) are formed in the N-well region 102. A gate film 107 such as poly-silicon is formed via an insulating layer not shown between the P-type impurity region 104 (source) and the P-type impurity region 106 (drain). Furthermore, a N-type impurity region 105 is formed in the N-well region 102. The output terminal CP10 of the operational amplifier 10 is connected to the P-type impurity region 104 (source). The output terminal CP20 (substrate voltage V20) of the charge pump 20 is connected to the N-type impurity region 105.

Owing to the structure of the PMOS transistor Q21 shown in FIG. 6, a parasitic diode 101 (forward voltage VF) is formed in a forward direction from the P-type impurity region 104 (source) toward the N-well region 102 and the N-type impurity region 105. Therefore, when the output voltage VL1 of the operational amplifier 10 is applied to the source of the PMOS transistor Q21, voltage (VL1−VF) is provided to the output voltage V20 (first output voltage) of the charge pump 20 as an initial value. It is noted that because the PMOS transistor Q21 is a transistor whose threshold voltage is low, its depletion layer 108 is thin and the voltage VF is relatively small.

The source of the PMOS transistor Q21 and a drain of the NMOS transistor Q22 are connected to the output terminal CP10 of the operational amplifier 10. A drain of the PMOS transistor Q21 and a source of the NMOS transistor Q22 are connected to one end (plus-side terminal) of the capacitor C21. The signal S12L is applied to a gate of the PMOS transistor Q21 and the signal S11L is applied to a gate of the NMOS transistor Q22. The output voltage V20 of the charge pump 20 is provided to a substrate of the PMOS transistor Q21.

A source of the PMOS transistor Q25 and a drain of the NMOS transistor Q26 are connected to the output terminal CP20 of the charge pump 20. A drain of the PMOS transistor Q25 and a source of the NMOS transistor Q26 are connected to one end (plus-side terminal) of the capacitor C21. The signal S22L is applied to a gate of the PMOS transistor Q25 and the signal S21L is applied to a gate of the NMOS transistor Q26. The output voltage V20 of the charge pump 20 is provided to a substrate of the PMOS transistor Q25.

A source of the PMOS transistor Q23 and a drain of the NMOS transistor Q24 are connected to another end (minus-side terminal) of the capacitor C21. A drain of the PMOS transistor Q23 and a source of the NMOS transistor Q24 are connected to the output terminal CP10 of the operational amplifier 10. The signal S22L is applied to a gate of the PMOS transistor Q23 and the signal S21L is applied to a gate of the NMOS transistor Q24. The output voltage V20 of the charge pump 20 is provided to a substrate of the PMOS transistor Q23.

A drain of the NMOS transistor Q27 is connected to the other end (minus-side terminal) of the capacitor C21 and a source of the NMOS transistor Q27 is connected to the VSS. The signal S11L is applied to a gate of the NMOS transistor Q27.

The PWON signal is applied to a gate of the NMOS transistor Q28 via the inverter 21. A drain of the NMOS transistor Q28 is connected to the output terminal CP20 of the charge pump 20 and a source of the NMOS transistor Q28 is connected to the VSS. The PWON signal turns to the level H after when the DC/DC converter 5 is activated, so that the NMOS transistor Q28 turns always OFF, shutting down the output terminal CP20 from the VSS.

The charge pump 20 operates normally as follows.

That is, as for the state of each driving signal from the driving circuit 70 during the charging period, the signal S11L is on the level H, the signal S12L is on the level L, the signal S21L is on the level L and the signal S22L is on the level H. Therefore, while the PMOS transistor Q21 and the NMOS transistor Q22 turn ON and the NMOS transistor Q27 turns ON, the PMOS transistor Q25 and the NMOS transistor Q26 turn OFF and the PMOS transistor Q23 and the NMOS transistor Q24 turn OFF. Accordingly, the capacitor C21 is charged by the voltage VL1.

In contrary, as for the state of each driving signal from the driving circuit 70 during the boosting period, the signal S11L is on the level L, the signal S12L is on the level H, the signal S21L is on the level H and the signal S22L is on the level L. Therefore, while the PMOS transistor Q21 and the NMOS transistor Q22 turn OFF and the NMOS transistor Q27 turns OFF, the PMOS transistor Q25 and the NMOS transistor Q26 turn ON and the PMOS transistor Q23 and the NMOS transistor Q24 turn ON. Accordingly, the output voltage V20 is boosted to the voltage VL2 (=2×VL1) in which the charged voltage VL1 of the capacitor C21 is added to the output voltage VL1 of the operational amplifier 10.

It is noted that during the charging period, the boosted voltage VL2 in the boosting period before the charging period is charged to the capacitor C22, so that the output voltage V20 of the charge pump 20 during the normal operation is almost fixed to VL2 when viewed across the whole period.

—Structure of the Charge Pump 30 and Normal Operation—

The charge pump 30 is a circuit for boosting the output voltage V10 (=VL1) of the operational amplifier 10 by three times to the voltage VL3.

As shown in FIG. 1, the charge pump 30 has a PMOS transistor Q31 and a NMOS transistor Q32 that operate in a pair, a PMOS transistor Q35 and a NMOS transistor Q36 that operate in a pair, a PMOS transistor Q33 and a NMOS transistor Q34 that operate in a pair, NMOS transistors Q37 and Q38, an inverter 31, a capacitor C31 for performing charging and boosting operations and a capacitor C32, connected to an output terminal CP30, for stabilizing the circuit.

Figure 7:
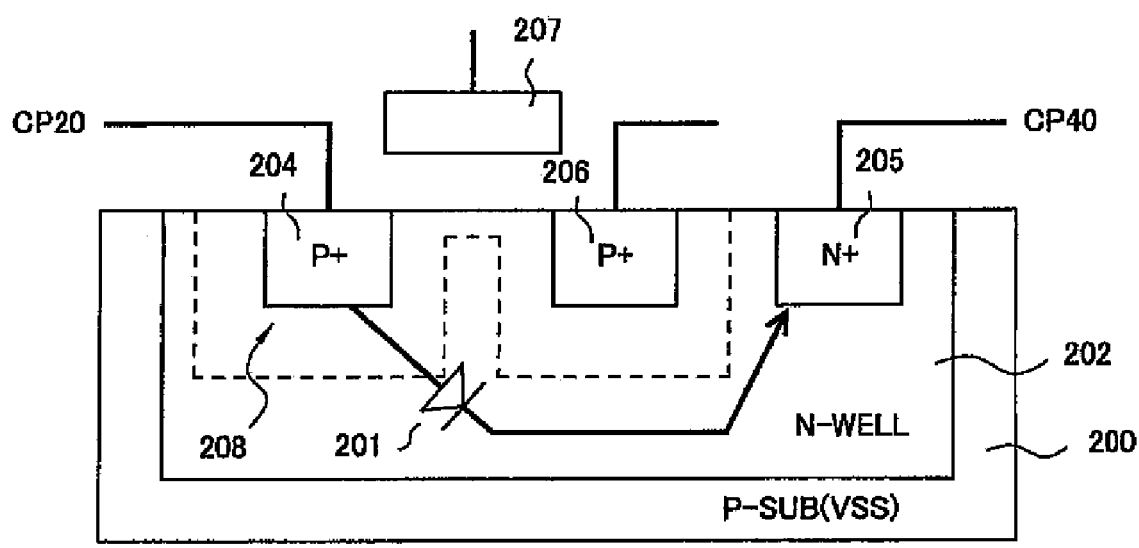
FIG. 7 is a section view of a structure of another PMOS transistor within a charge pump.

FIG. 7 is a section view showing a structure of the PMOS transistor Q33. As shown in FIG. 7, the PMOS transistor Q31 is formed in a N-well region 202 within a P-type substrate 200 (VSS level). A P-type impurity region 204 (drain) and a P-type impurity region 206 (source) are formed in the N-well region 202. A gate film 207 such as poly-silicon is formed via an insulating layer not shown between the P-type impurity region 204 (drain) and the P-type impurity region 206 (source). Furthermore, a N-type impurity region 205 is formed in the N-well region 202. The output terminal CP20 of the charge pump 20 is connected to the P-type impurity region 204 (drain). An output terminal CP40 (substrate voltage V40) of the charge pump 40 is connected to the N-type impurity region 205.

Owing to the structure of the PMOS transistor Q33 shown in FIG. 7, a parasitic diode 201 (forward voltage VF) is formed in a forward direction from the P-type impurity region 204 (drain) to the N-well region 202 and the N-type impurity region 205. Therefore, when the output voltage VL2 of the charge pump 20 is applied to the source of the PMOS transistor Q33, voltage (VL2−VF) is provided to the output voltage V30 of the charge pump 30 as an initial value. It is noted that because the PMOS transistor Q33 is a transistor whose threshold voltage is high, its depletion layer 208 is thick and the voltage VF is relatively large.

A source of the PMOS transistor Q31 and a drain of the NMOS transistor Q32 are connected to the output terminal CP10 of the operational amplifier 10. A drain of the PMOS transistor Q31 and a source of the NMOS transistor Q32 are connected to one end (plus-side terminal) of the capacitor C31. The signal S12H is applied to a gate of the PMOS transistor Q31 and the signal S11H is applied to a gate of the NMOS transistor Q32. The output voltage V40 of the charge pump 40 is provided to a substrate of the PMOS transistor Q31.

A source of the PMOS transistor Q35 and a drain of the NMOS transistor Q36 are connected to the output terminal CP30 of the charge pump 30. A drain of the PMOS transistor Q35 and a source of the NMOS transistor Q36 are connected to one end (plus-side terminal) of the capacitor C31. The signal S22H is applied to a gate of the PMOS transistor Q35 and the signal S21H is applied to a gate of the NMOS transistor Q36. The output voltage V40 of the charge pump 40 is provided to a substrate of the PMOS transistor Q35.

A source of the PMOS transistor Q33 and a drain of the NMOS transistor Q34 are connected to another end (minus-side terminal) of the capacitor C31. A drain of the PMOS transistor Q33 and a source of the NMOS transistor Q34 are connected to the output terminal CP20 of the charge pump 20. The signal S22H is applied to a gate of the PMOS transistor Q33 and the signal S21H is applied to a gate of the NMOS transistor Q34. The output voltage V40 of the charge pump 40 is provided to a substrate of the PMOS transistor Q33.

A drain of the NMOS transistor Q37 is connected to the other end (minus-side terminal) of the capacitor C31 and a source of the NMOS transistor Q37 is connected to the VSS. The signal S11H is applied to a gate of the NMOS transistor Q37.

The PWON signal is applied to a gate of the NMOS transistor Q38 via the inverter 31. A drain of the NMOS transistor Q38 is connected to the output terminal CP30 of the charge pump 30 and a source of the NMOS transistor Q38 is connected to the VSS. The PWON signal turns to the level H after when the DC/DC converter 5 is activated, so that the NMOS transistor Q38 turns always OFF, shutting down the output terminal CP30 from the VSS.

The charge pump 30 operates normally as follows.

That is, as for the state of each driving signal from the driving circuit 80 during the charging period, the signal S11H is on the level H, the signal S12H is on the level L, the signal S21H is on the level L and the signal S22L is on the level H. Therefore, while the PMOS transistor Q31 and the NMOS transistor Q32 turn ON and the NMOS transistor Q37 turns ON, the PMOS transistor Q35 and the NMOS transistor Q36 turn OFF and the PMOS transistor Q33 and the NMOS transistor Q34 turn OFF. Accordingly, the capacitor C31 is charged by the voltage VL1.

As for the state of each driving signal from the driving circuit 80 during the boosting period in contrary, the signal S11H is on the level L, the signal S12H is on the level H, the signal S21H is on the level H and the signal S22H is on the level L. Therefore, while the PMOS transistor Q31 and the NMOS transistor Q32 turn OFF and the NMOS transistor Q37 turns OFF, the PMOS transistor Q35 and the NMOS transistor Q36 turn ON and the PMOS transistor Q33 and the NMOS transistor Q34 turn ON. Accordingly, the output voltage V30 is boosted to the voltage VL3 (=3×VL1) in which the charged voltage VL1 of the capacitor C21 is added to the output voltage VL2 of the charge pump 20.

It is noted that during the charging period, the boosted voltage VL3 in the boosting period before the charging period is charged to the capacitor C32, so that the output voltage V30 of the charge pump 30 during the normal operation is almost fixed to VL3 when viewed across the whole period.

—Structure of the Charge Pump 40 and Normal Operation—

The charge pump 40 is a circuit for boosting the output voltage V10 (=VL1) of the operational amplifier 10 by four times to the voltage VL4.

As shown in FIG. 1, the charge pump 40 has a PMOS transistor Q41 and a NMOS transistor Q42 that operate in a pair, a PMOS transistor Q45 and a NMOS transistor Q46 that operate in a pair, a PMOS transistor Q43 and a NMOS transistor Q44 that operate in a pair, NMOS transistors Q47 and Q48, an inverter 41, a capacitor C41 for performing charging and boosting operations and a capacitor C42, connected to the output terminal CP40, for stabilizing the circuit.

A source of the PMOS transistor Q41 and a drain of the NMOS transistor Q42 are connected to the output terminal CP10 of the operational amplifier 10. A drain of the PMOS transistor Q41 and a source of the NMOS transistor Q42 are connected to one end (plus-side terminal) of the capacitor C41. The signal S12H is applied to a gate of the PMOS transistor Q41 and the signal S11H is applied to a gate of the NMOS transistor Q42. The output voltage V40 of the charge pump 40 is provided to a substrate of the PMOS transistor Q41.

A source of the PMOS transistor Q45 and a drain of the NMOS transistor Q46 are connected to the output terminal CP40 of the charge pump 40. A drain of the PMOS transistor Q45 and a source of the NMOS transistor Q46 are connected to one end (plus-side terminal) of the capacitor C41. The signal S22H is applied to a gate of the PMOS transistor Q45 and the signal S21H is applied to a gate of the NMOS transistor Q46. The output voltage V40 of the charge pump 40 is provided to a substrate of the PMOS transistor Q45.

A source of the PMOS transistor Q43 and a drain of the NMOS transistor Q44 are connected to another end (minus-side terminal) of the capacitor C41. A drain of the PMOS transistor Q43 and a source of the NMOS transistor Q44 are connected to the output terminal CP30 of the charge pump 30. The signal S22H is applied to a gate of the PMOS transistor Q43 and the signal S21H is applied to a gate of the NMOS transistor Q44. The output voltage V40 of the charge pump 40 is provided to a substrate of the PMOS transistor Q43.

A drain of the NMOS transistor Q47 is connected to the other end (minus-side terminal) of the capacitor C41 and a source of the NMOS transistor Q47 is connected to the VSS. The signal S11H is applied to a gate of the NMOS transistor Q47.

The PWON signal is applied to a gate of the NMOS transistor Q48 via the inverter 41. A drain of the NMOS transistor Q48 is connected to the output terminal CP40 of the charge pump 40 and a source of the NMOS transistor Q48 is connected to the VSS. The PWON signal turns to the level H after when the DC/DC converter 5 is activated, so that the NMOS transistor Q48 turns always OFF, shutting down the output terminal CP40 from the VSS.

The charge pump 40 operates normally as follows.

That is, as for the state of each driving signal from the driving circuit 80 in the charging period, the signal S11H is on the level H, the signal S12H is on the level L, the signal S21H is on the level L and the signal S22H is on the level H. Therefore, while the PMOS transistor Q41 and the NMOS transistor Q42 turn ON and the NMOS transistor Q47 turns ON, the PMOS transistor Q45 and the NMOS transistor Q46 turn OFF and the PMOS transistor Q43 and the NMOS transistor Q44 turn OFF. Accordingly, the capacitor C41 is charged by the voltage VL1.

As for the state of each driving signal from the driving circuit 80 in the boosting period in contrary, the signal S11H is on the level L, the signal S12H is on the level H, the signal S21 H is on the level H and the signal S22H is on the level L. Therefore, while the PMOS transistor Q41 and the NMOS transistor Q42 turn OFF and the NMOS transistor Q47 turns OFF, the PMOS transistor Q45 and the NMOS transistor Q46 turn ON and as the PMOS transistor Q43 and the NMOS transistor Q44 turn ON. Accordingly, the output voltage V40 is boosted to the voltage VL4 (=4×VL1) in which the charged voltage VL1 of the capacitor C41 is added to the output voltage VL3 of the charge pump 30.

It is noted that during the charging period, the boosted voltage VL4 in the boosting period before the charging period is charged to the capacitor C42, so that the output voltage V40 of the charge pump 40 during the normal operation is almost fixed to VL4 when viewed across the whole period.

—Operation of Reference Device in Build-up Period—

The overall operation of the DC/DC converter 5 as the reference device will be explained with reference to FIG. 8 by noticing especially on the build-up period.

Figure 8:
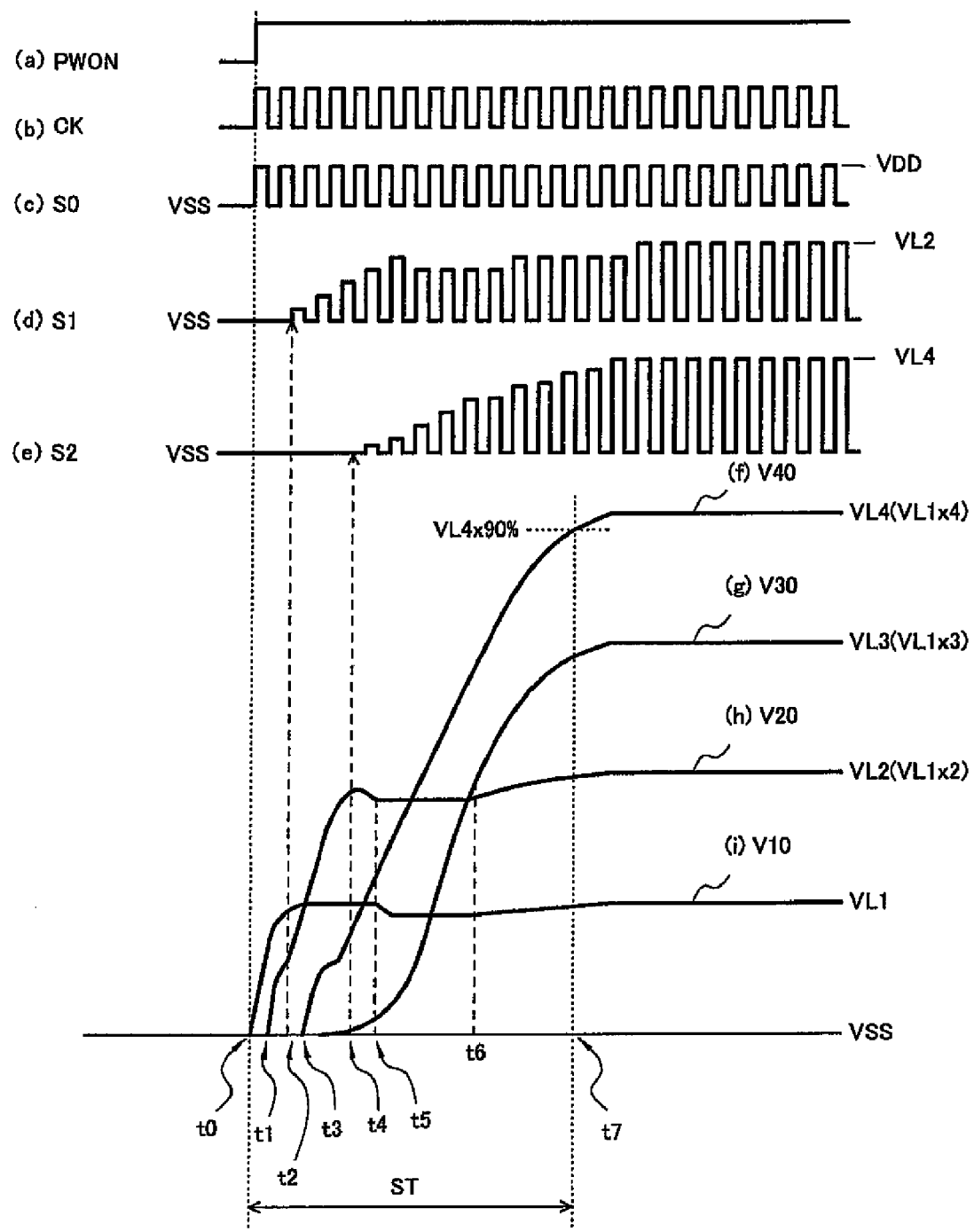
FIG. 8 is a timing chart of the operations of the DC/DC converter exemplified as the reference device illustrated by notifying on a build-up period thereof.

FIG. 8 is a timing chart of the operation of the DC/DC converter 5 illustrated by notifying on the build-up period thereof, indicating waveforms of (a) the PWON signal, (b) the clock signal CK, (c) the signal S0 of the gate circuit 12, (d) the output signal S1 of the level shifter 50, (e) the output signal S2 of the level shifter 60, (f) the output voltage V40 of the charge pump 40, (g) the output voltage V30 of the charge pump 30, (h) the output voltage V20 of the charge pump 20 and (i) the output voltage V10 of the operational amplifier 10, respectively. It is noted that in general the build-up period is a period during which the output voltage of the converter reaches to voltage of 90% of target voltage from the activation of the converter and the build-up period ST corresponds to a period from time t0 to time t7 in FIG. 8.

The DC/DC converter 5 starts its operation when the PWON signal turns to the level H at the time t0. When the PWON signal turns to the level H, the operational amplifier 10 starts its operation and the output voltage V10 of the operational amplifier 10 rises quickly as shown in FIG. 8(i).

While the initial value of the output voltage V20 of the charge pump 20 is (V10-VF) (where VF is the forward voltage of the parasitic diode in the PMOS transistor within the charge pump 20) (see FIG. 6), the voltage V10 exceeds the VF at time t1 and the voltage V20 starts to increase.

The voltage V20 rises to voltage capable of operating the level shifter 50, i.e., to the threshold voltage for operating the PMOS transistors Q53 and Q54 within the level shifter 50, at time t2. Thereby, the signal S1 of the level shifter 50 is generated from the time t2 as shown by FIG. 8(d).

When the signal S1 of the level shifter 50 is generated, the driving circuit 70 starts its operation, generating the signals S11L, S12L, S21L and S22L for driving the charge pump 20. Accordingly, the charge pump 20 starts its operation on and after the time t2 and its output voltage V20 rises around to the voltage VL2.

Because the initial value of the output voltage V40 of the charge pump 40 is (V20−VF) (where VF is the forward voltage of the parasitic diode in the PMOS transistor within the charge pump 30) (see FIG. 7), the voltage V40 also rises along with the rise of the output voltage V20 of the charge pump 20. Then, the voltage V40 rises to voltage capable of operating the level shifter 60, i.e., to the threshold voltage for operating the PMOS transistors Q63 and Q64 within the level shifter 60, at time t4. Thereby, the signal S2 of the level shifter 60 is generated from the time t4 as shown by FIG. 8(e). Thus, because the PMOS transistors within the level shifter 60 have the threshold value higher than those within the level shifter 50, they do not start their operations even when the output voltage V20 reaches to VL1 and start the operations from the time t4 behind the time t2.

When the signal S2 of the level shifter 60 is generated, the driving circuit 80 starts its operation, generating the signals S11H, S12H, S21H and S22H for driving the charge pumps 30 and 40. Accordingly, the charge pumps 30 and 40 start their operations on and after the time t4 and the output voltages V30 and V40 of the charge pumps 30 and 40 rise around to the voltages VL3 and VL4, respectively.

As described above, the charge pump 20 of the initial stage operates at first to increase the voltage V20 and then the voltages V40 and V30 rise sequentially in the DC/DC converter 5.

While the DC/DC converter 5 as the reference device has been described in detail above, there is a case when the DC/DC converter 5 does not operate when the reference voltage (VL1) is low. This point will be explained below.

When the voltage VL1 is low due to the parasitic diode formed in the PMOS transistor within the charge pump 20, there arises a case when the DC/DC converter 5 does not operate. For instance, imagine a case when the voltage VL1 is 1.0 [V] (low voltage) and the forward voltage VF of the parasitic diode is 0.6 [V]. At this time, the initial value of the output voltage V20 of the charge pump 20 is the voltage (VL1-VF), i.e., 0.4 [V], as explained with reference to FIG. 6.

When the operating threshold value of the PMOS transistor Q54 within the level shifter 50 is 0.6 [V] here, the PMOS transistor Q54 does not start its operation by the voltage V20 of 0.4 [V]. Accordingly, the signal S1 of the level shifter 50 remains to be VSS and the signals S11H, S12H, S21H and S22H for driving the charge pump 20 are not generated in the driving circuit 70 on the later stage. Therefore, because the voltage VL1 is low, the DC/DC converter 5 does not normally operate in this case.

Figure 9:
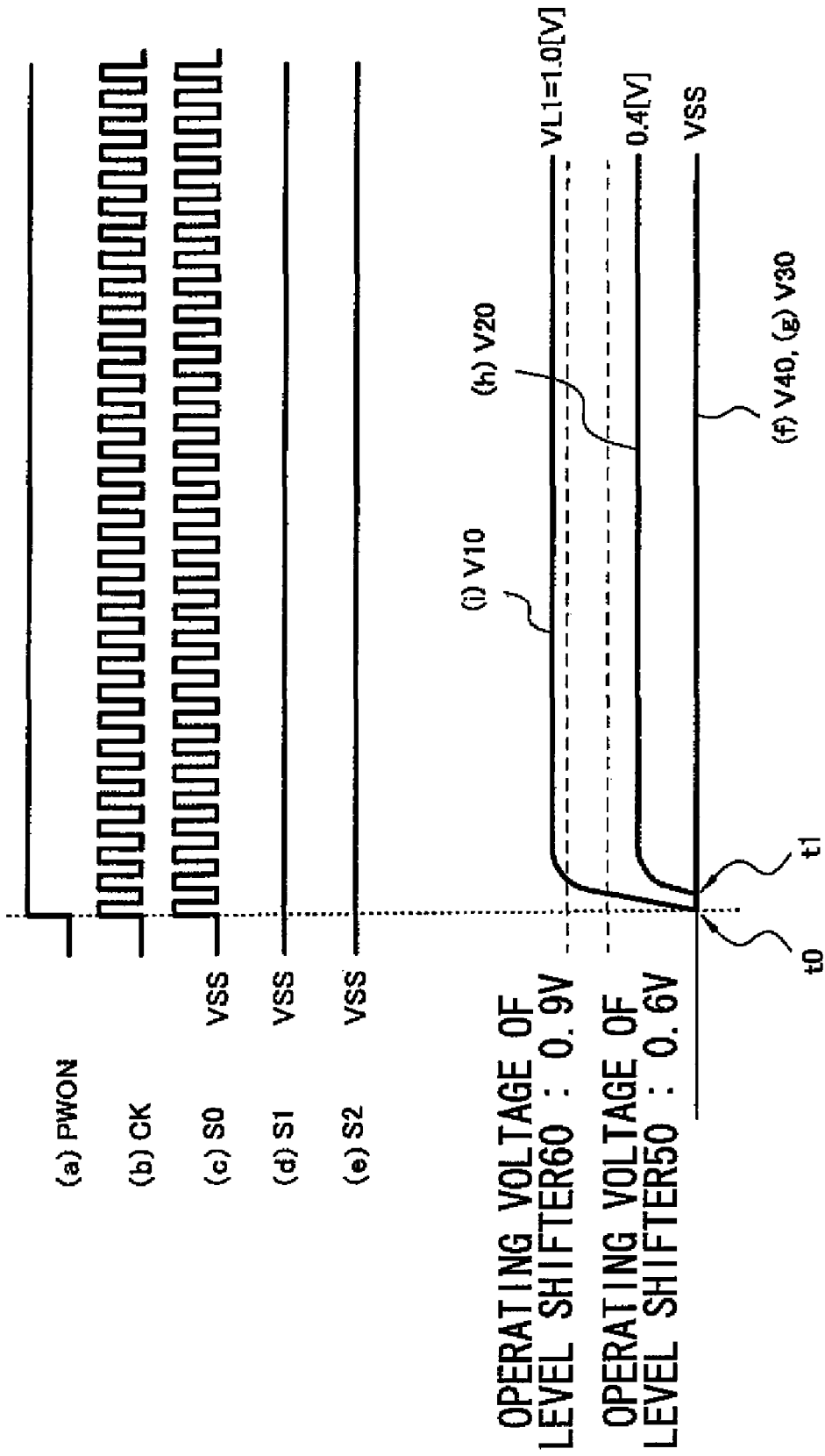
FIG. 9 is a timing chart of the DC/DC converter as the reference device in case when it does not operate because reference voltage is low.

FIG. 9 is a timing chart of the DC/DC converter 5 in the case of the above-mentioned example when it does not operate because the voltage VL1 is low. It is noted that the respective signals (a) through (i) in FIG. 9 correspond to those shown in FIG. 8. In the example shown in FIG. 9, the operating threshold value of the PMOS transistor Q54 within the level shifter 50 (operating voltage of the level shifter 50) is set at 0.6 [V], and the operating threshold value of the PMOS transistor Q64 within the level shifter 60 (operating voltage of the level shifter 60) is set at 0.9 [V]. As shown in FIG. 9, the output voltage V20 of the charge pump 20 is fixed to 0.4 [V] that is lower than the operating voltage of 0.6 [V] of the level shifter 50, and no signal S1 of the level shifter 50 is generated. Accordingly, the charge pumps 20, 30 and 40 do not start their operations and the output voltages V30 and V40 of the charge pumps 30 and 40 remain at VSS.

First Exemplary Embodiment

One exemplary embodiment of the charge pump-type DC/DC converter of the invention will be explained below. The DC/DC converter 1 of the present exemplary embodiment is what the DC/DC converter 5 (reference device) described above has been improved so that it steadily operates even when the reference voltage VL1 for the boosting operation is low.

—Structure of the DC/DC Converter 1—

Figure 10:
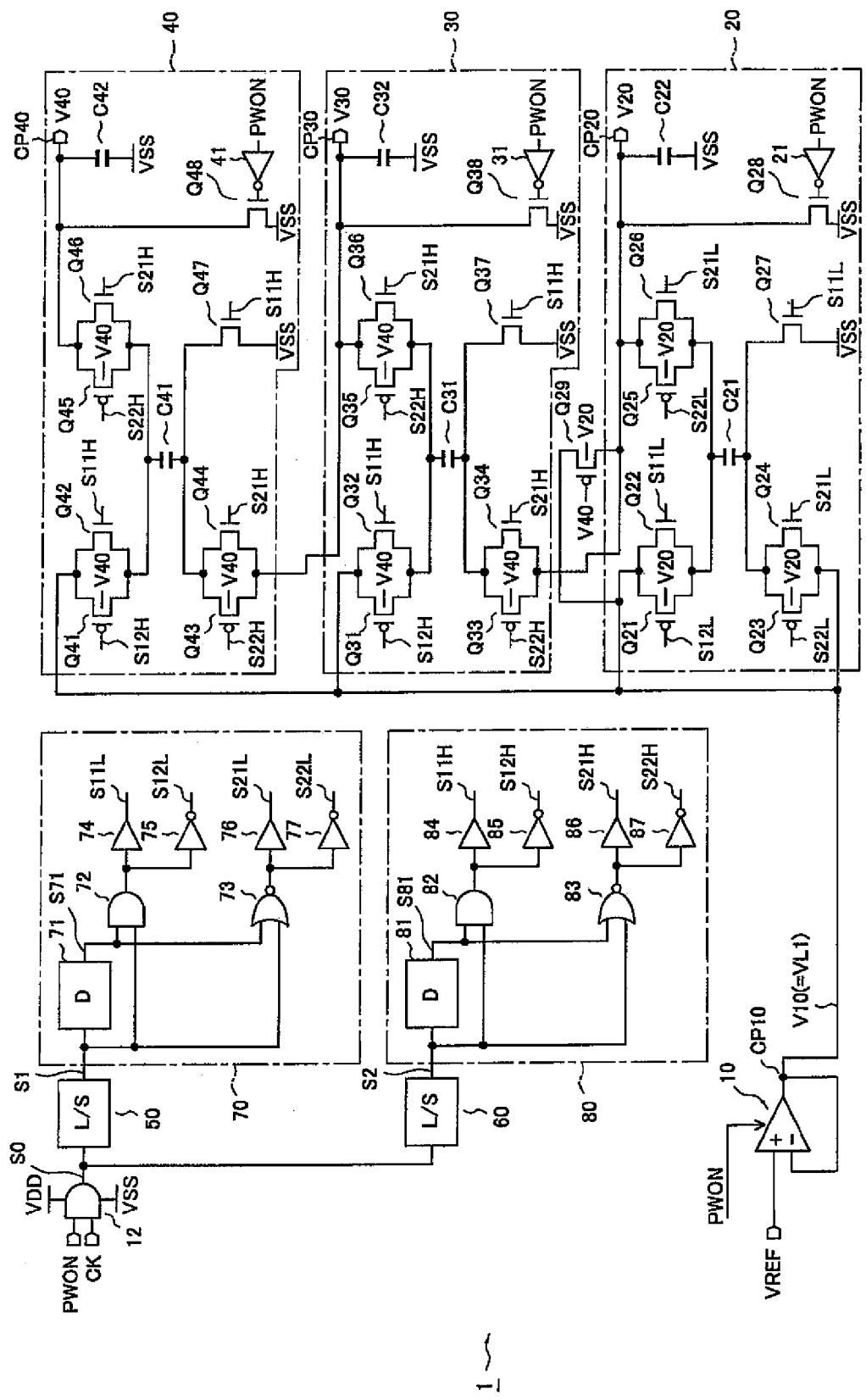
FIG. 10 is a circuit diagram of the DC/DC converter according to a first exemplary embodiment.

At first, a circuit structure of the DC/DC converter 1 of the exemplary embodiment will be explained with reference to FIG. 10. While FIG. 10 is a circuit diagram of the DC/DC converter 1 of the first exemplary embodiment, the same parts with those of the DC/DC converter 5 (reference device) shown in FIG. 1 will be denoted by the same reference numerals and an overlapped explanation thereof will be omitted here. It is noted that the level shifter 50 and the driving circuit 70 correspond to a driving circuit of the invention in the DC/DC converter 1.

The DC/DC converter 1 is different from the DC/DC converter 5 only in that a PMOS transistor Q29 (third transistor of the invention) is newly added. As shown in FIG. 10, a source of the PMOS transistor Q29 is connected to the output terminal CP10 of the operational amplifier 10. A drain of the PMOS transistor Q29 is connected to the output terminal CP20 of the charge pump 20. The output voltage V40 of the charge pump 40 is applied to a gate of the PMOS transistor Q29. The output voltage V20 of the charge pump 20 is applied to a substrate of the PMOS transistor Q29. It is noted that a threshold voltage of the PMOS transistor Q29 is set high by taking withstanding voltage into account.

The PMOS transistor Q29 is provided to short-circuit the output terminal CP20 of the charge pump 20 with the output terminal CP10 of the operational amplifier 10 during the build-up period of the DC/DC converter 1. That is, because the output voltage V40 of the charge pump 40 is VSS during the build-up period of the DC/DC converter 1, the PMOS transistor Q29 turns ON and short-circuits the output terminal CP20 of the charge pump 20 with the output terminal CP10 of the operational amplifier 10. When the output voltage V40 of the charge pump 40 fully rises after an elapse of the build-up period of the DC/DC converter 1, the PMOS transistor Q29 turns OFF and shuts down the output terminal CP20 of the charge pump 20 from the output terminal CP10 of the operational amplifier 10.

—Operation of the DC/DC Converter 1 in Build-up Period—

Figure 11:
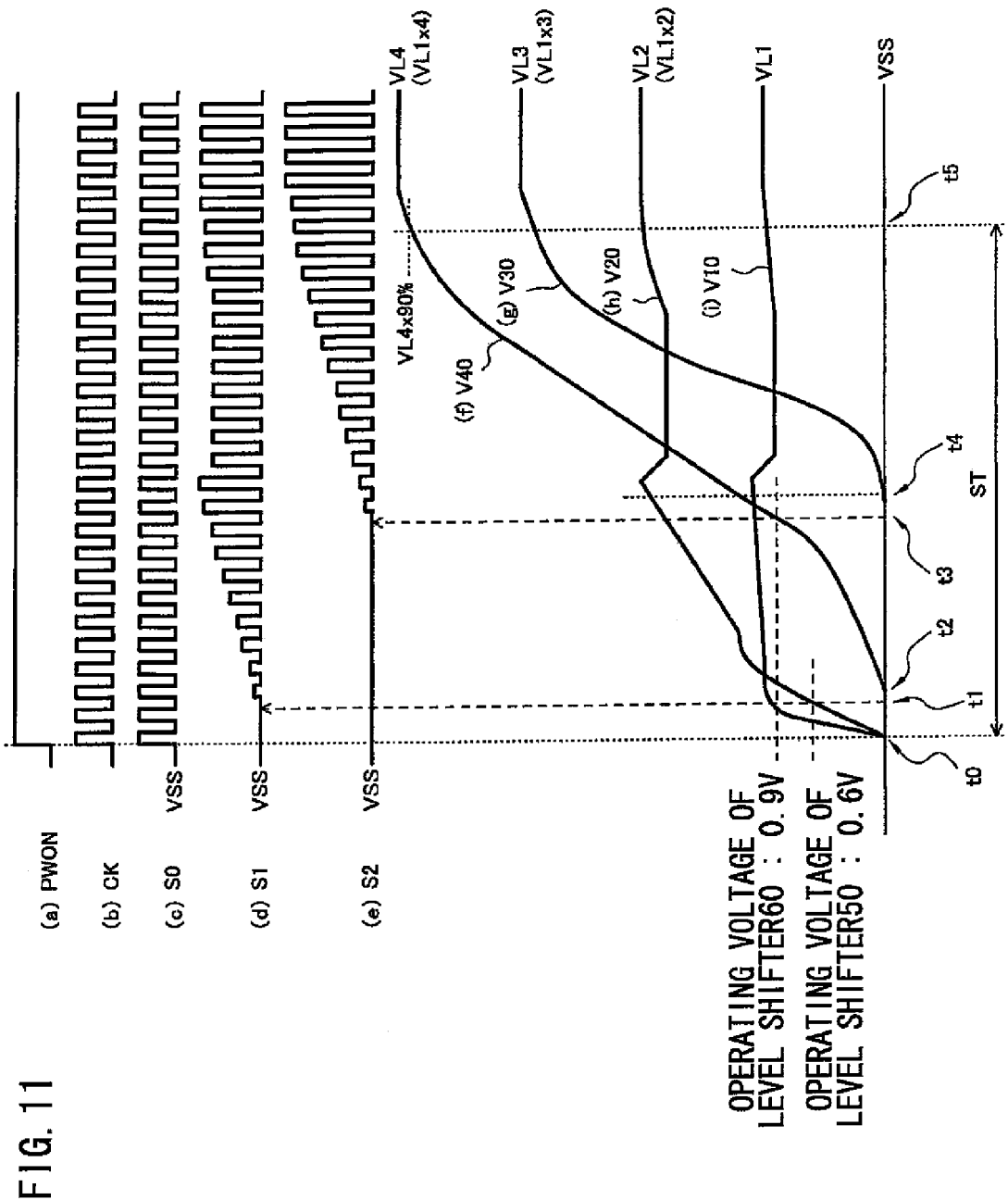
FIG. 11 is a timing chart of the operations of the DC/DC converter of the first exemplary embodiment illustrated by notifying on a build-up period thereof.

Next, the overall operation of the DC/DC converter 1 of the exemplary embodiment will be explained with reference to FIG. 11 illustrated by noticing specifically on the build-up period thereof.

FIG. 11 is a timing chart of the operation of the DC/DC converter 1 illustrated by notifying on the build-up period thereof, indicating waveforms of (a) the PWON signal, (b) the clock signal CK, (c) the signal S0 of the gate circuit 12, (d) the output signal S1 of the level shifter 50, (e) the output signal S2 of the level shifter 60, (f) the output voltage V40 of the charge pump 40, (g) the output voltage V30 of the charge pump 30, (h) the output voltage V20 of the charge pump 20 and (i) the output voltage V10 of the operational amplifier 10, respectively. It is noted that the build-up period ST corresponds to a period from time t0 to time t5 in FIG. 11.

FIG. 11 shows a case when the VL1 is set at 1.0 [V], the forward voltage VF of the parasitic diode of the PMOS transistor within the charge pump 20 is set at 0.6 [V], the operating threshold value of the PMOS transistor Q54 within the level shifter 50 is set at 0.6 [V] and the operating threshold value of the PMOS transistor Q64 within the level shifter 60 is set at 0.9 [V] for example.

The DC/DC converter 1 starts its operation when the PWON signal turns to the level H at time t0. When the PWON signal turns to the level H, the operational amplifier 10 starts its operation and the output voltage V10 of the operational amplifier 10 rises quickly as shown in FIG. 11(i).

Because the output voltage V40 of the charge pump 40 is VSS at the time t0, the PMOS transistor Q29 turns ON, short-circuiting the output terminal CP20 of the charge pump 20 with the output terminal CP10 of the operational amplifier 10. Accordingly, the voltage V20 starts to rise from the time t0 as shown by FIG. 11(h).

The voltage V20 rises to voltage capable of operating the level shifter 50, i.e., to the operating voltage (0.6 [V]) of the level shifter 50, at time t1. Thereby, the signal S1 of the level shifter 50 is generated from the time t1 as shown by FIG. 11(d).

When the signal S1 of the level shifter 50 is generated, the driving circuit 70 starts its operation, generating the signals S11L, S12L, S21L and S22L for driving the charge pump 20. Accordingly, the charge pump 20 starts its operation on and after the time t1.

Because the initial value of the output voltage V40 of the charge pump 40 is (V20−VF) (where VF is the forward voltage of the parasitic diode in the PMOS transistor within the charge pump 30) (see FIG. 7), the voltage V40 also starts to rise from the time t2 along with the rise of the output voltage V20. Then, the voltage V40 rises to voltage capable of operating the level shifter 60, i.e., to the operating voltage (0.9 [V]) of the level shifter 60, at time t3. Thereby, the signal S2 of the level shifter 60 is generated from the time t3 as shown by FIG. 11(e).

When the signal S2 of the level shifter 60 is generated, the driving circuit 80 starts its operation, generating the signals S11H, S12H, S21H and S22H for driving the charge pumps 30 and 40. Accordingly, the charge pumps 30 and 40 start their operations on and after the time t3 and the output voltages V30 and V40 of the charge pumps 30 and 40 rise around to the voltages VL3 and VL4, respectively.

It is noted that the output voltage V40 of the charge pump 40 fully rises at time t4, so that the PMOS transistor Q29 turns OFF and shuts down the output terminal of the charge pump 20 from the output terminal of the operational amplifier 10.

It is also noted that although the output voltage V10 of the operational amplifier 10 slightly increases until the time t4 when the PMOS transistor Q29 turns OFF by being influenced by the rise of the voltage V20, it drops and converges to the voltage VL1 on and after the time t4 as shown by FIG. 11(i). Furthermore, the rise of the voltage V20 is not sharp until the time t4 by being influenced by the output voltage V10 of the operational amplifier 10 as shown by FIG. 11(h).

As described above, according to the DC/DC converter 1 of the present exemplary embodiment, the PMOS transistor Q29 for short-circuiting the output terminal of the charge pump 20 of the initial stage with the reference voltage (VL1) has been provided to eliminate the influence of the parasitic diode of the PMOS transistor within the charge pump 20 of the initial stage during the build-up period. The PMOS transistor Q29 is controlled by the output voltage of the charge pumps other than that of the initial stage (the charge pump 40 in the above explanation) and releases the above-mentioned short-circuit along with the rise of the output voltage of the charge pump other than that of the initial stage.

The DC/DC converter 1 will not be affected by the parasitic diode within the charge pump 20 of the initial stage in the build-up period and the initial value of the output voltage V20 of the charge pump 20 is almost the same value with the reference voltage. Accordingly, the charge pump 20 of the initial stage normally operates and the operation of the DC/DC converter 1 is guaranteed, provided that the reference voltage is at least larger than the operating voltage of the level shifter 50.

Second Exemplary Embodiment

Another exemplary embodiment of the charge pump-type DC/DC converter of the invention will be explained below. A DC/DC converter 2 of the present exemplary embodiment is a further improvement of DC/DC converter 1 described above so as to shorten the build-up period.
—Structure of the DC/DC Converter 2—

Figure 12:
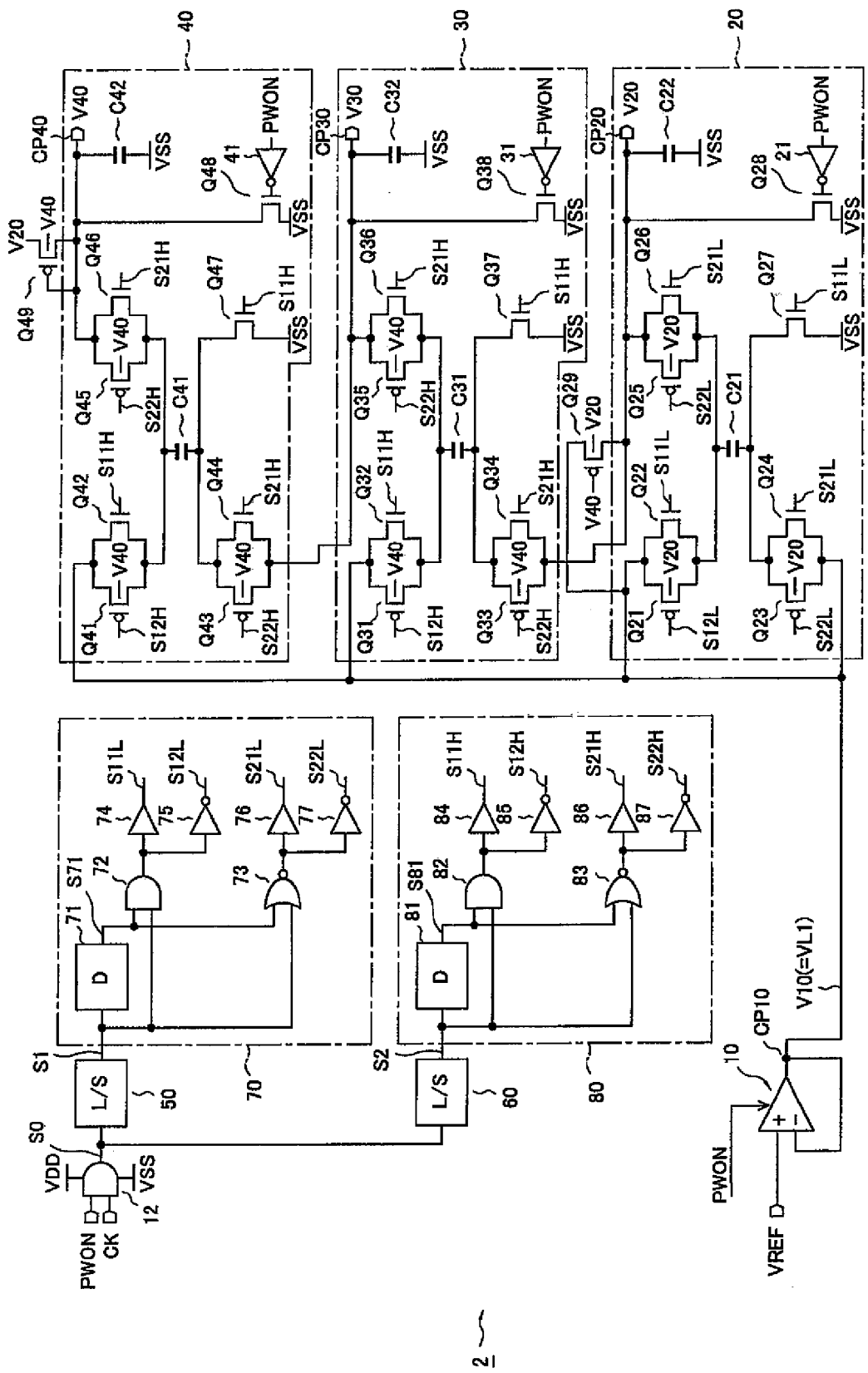
FIG. 12 is a circuit diagram of the DC/DC converter according to a second exemplary embodiment.

At first, a circuit structure of the DC/DC converter 2 of the present exemplary embodiment will be explained with reference to FIG. 12. While FIG. 12 is a circuit diagram of the DC/DC converter 2, the same parts with those in the DC/DC converters shown in FIGS. 1 and 10 will be denoted by the same reference numerals and no overlapped explanation will be made below.

The DC/DC converter 2 is different from the DC/DC converter 1 only in that a PMOS transistor Q49 (fourth transistor of the invention) is newly added. As shown in FIG. 12, a source of the PMOS transistor Q49 is connected to the output terminal CP20 (voltage V20) of the charge pump 20. A drain and a gate of the PMOS transistor Q49 are connected to the output terminal CP40 of the charge pump 40. The output voltage V40 is applied to a substrate of the PMOS transistor Q49. It is noted that a threshold voltage of the PMOS transistor Q49 is set high by taking withstanding voltage into account.

The PMOS transistor Q49 is provided to short-circuit the output terminal CP20 of the charge pump 20 with the output terminal CP40 of the charge pump 40 during the build-up period of the DC/DC converter 2. That is, because the output voltage V40 of the charge pump 40 is on the level VSS during the build-up period of the DC/DC converter 2, the PMOS transistor Q49 turns ON, short-circuiting the output terminal CP20 of the charge pump 20 with the output terminal CP40 of the charge pump 40. When the build-up period of the DC/DC converter 2 elapses and the output voltage V40 of the charge pump 40 fully increases, the PMOS transistor Q49 turns OFF, shutting down the output terminal CP40 of the charge pump 40 from the output terminal CP20 of the charge pump 20.
—Operation of the DC/DC Converter 2 during Build-up Period—

Figure 13:
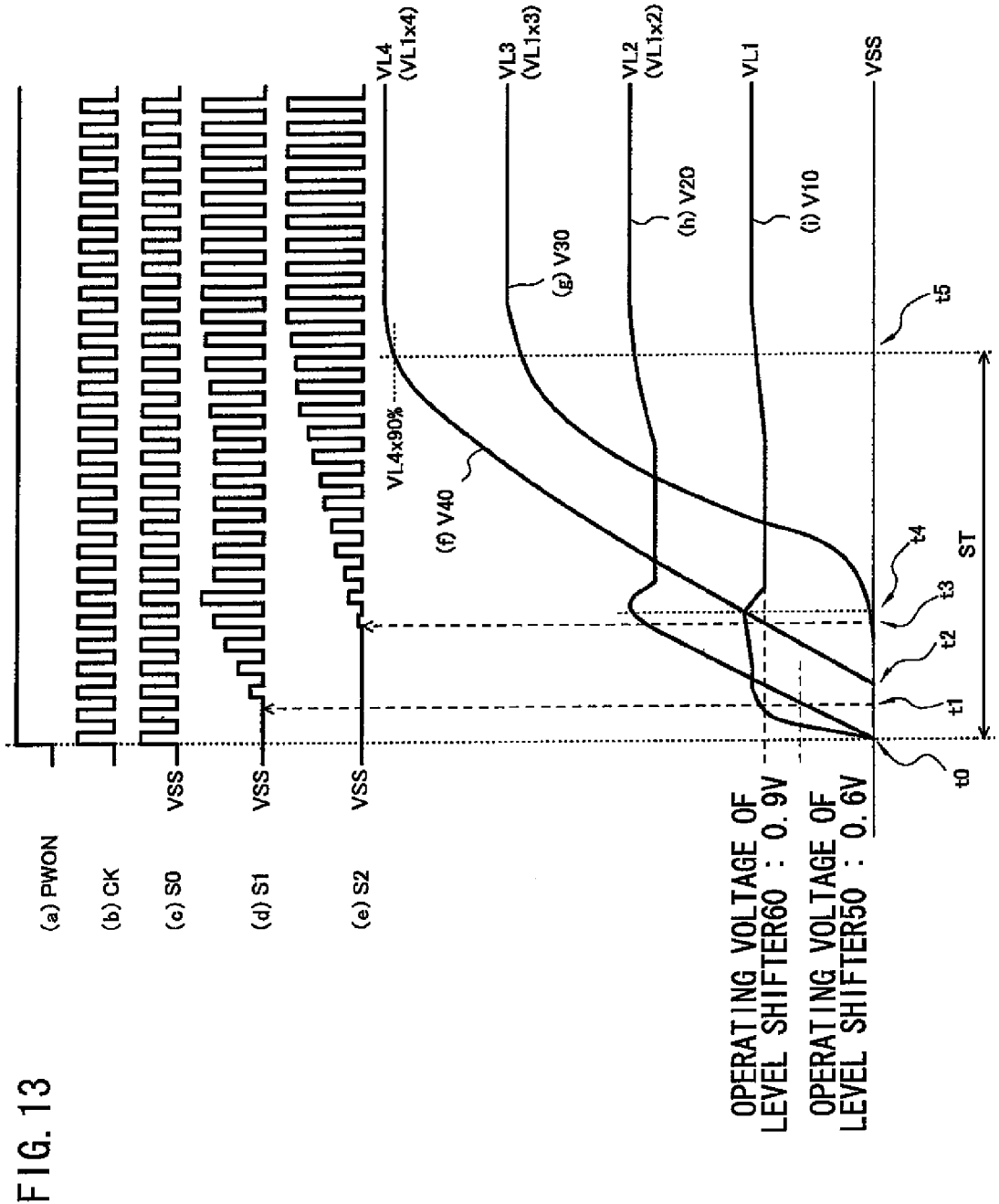
FIG. 13 is a timing chart of operations of the DC/DC converter of the second exemplary embodiment illustrated by notifying on a build-up period thereof.

Next, the whole operation of the DC/DC converter 2 of the present exemplary embodiment will be explained with reference to FIG. 13 illustrated by notifying especially on the build-up period.

FIG. 13 is a timing chart of the operation of the DC/DC converter 2 illustrated by notifying on the build-up period thereof. The respective waveforms (a) through (i) correspond to those shown in FIG. 11. It is noted that in FIG. 13, a build-up period ST corresponds to a period from time t0 to time t5.

FIG. 13 shows a case when the reference voltage (VL1) is set at 1.0 [V], the forward voltage VF of the parasitic diode of the PMOS transistor within the charge pump 20 is set at 0.6 [V], the operating threshold value of the PMOS transistor Q54 (operating voltage of the level shifter 50) within the level shifter 50 is set at 0.6 [V] and the operating threshold value of the PMOS transistor Q64 (operating voltage of the level shifter 60) within the level shifter 60 is set at 0.9 [V] for example.

The DC/DC converter 2 starts its operation when the PWON signal turns to the level H at time t0. When the PWON signal turns to the level H, the operational amplifier 10 starts its operation and the output voltage V10 of the operational amplifier 10 rises quickly as shown by FIG. 13(i).

Because the output voltage V40 of the charge pump 40 is VSS at the time t0, the voltage V20 starts to increase from the time to by the operation of the PMOS transistor Q29 in the same manner with the DC/DC converter 1 described above.

The voltage V20 rises to the operating voltage (0.6 [V]) of the level shifter 50 at time t1 and the signal S1 of the level shifter 50 is generated from the time t1 as shown by FIG. 13(d).

When the signal S1 of the level shifter 50 is generated, the driving circuit 70 starts its operation, generating the signals S11L, S12L, S21L and S22L for driving the charge pump 20. Accordingly, the charge pump 20 starts its operation on and after the time t1.

Meanwhile, because the output voltage of the charge pump 40 is VSS on and after the time to, the PMOS transistor Q49 turns ON, short-circuiting the output terminal CP40 of the charge pump 40 with the output terminal CP20 of the charge pump 20. Accordingly, the initial value of the output voltage V40 of the charge pump 40 becomes equal to the output voltage V20 of the charge pump 20. That is, as compared to the case of the DC/DC converter 1 described above (the initial value of the voltage V40 of the charge pump 40 is (V20−VF)), the initial value of the output voltage V40 becomes large in the DC/DC converter 2 of the present exemplary embodiment.

Along with the rise of the voltage V20, the voltage V40 rises to voltage capable of operating the level shifter 60, i.e., to the operating voltage (0.9 [V]) of the level shifter 60, at time t3. Thereby, the signal S2 of the level shifter 60 is generated from the time t3 as shown by FIG. 13(e).

When the signal S2 of the level shifter 60 is generated, the driving circuit 80 operates, generating the signals S11H, S12H, S21H and S22H for driving the charge pumps 30 and 40. Accordingly, the charge pumps 30 and 40 start their operations on and after the time t3 and the output voltages V30 and V40 of the charge pumps 30 and 40 rise around to the voltages VL3 and VL4, respectively.

It is noted that the output voltage V40 of the charge pump 40 fully rises at time t4, so that the PMOS transistor Q29 turns OFF and shuts down the output terminal of the charge pump 20 from the output terminal of the operational amplifier 10. It is also noted that because the initial value of the output voltage V40 of the charge pump 40 of the DC/DC converter 2 is higher than that of the DC/DC converter 1 described above, the voltage V40 sharply rises. Accordingly, the time t4 when the PMOS transistor Q29 turns OFF in FIG. 13 is faster than the time t4 shown in FIG. 11. Thereby, the build-up period ST of the DC/DC converter 2 of the present exemplary embodiment is made shorter than that of the DC/DC converter 1.

As described above, the DC/DC converter 2 of the present exemplary embodiment is what is provided, to the DC/DC converter 1, with the PMOS transistor Q49 that turns ON when the output voltage V40 of the charge pump 40 is low and applies the output voltage V20 of the charge pump 20 of the initial stage to the output terminal of the charge pump 40 as either one charge pump on and after the second stage, so that it is possible to increase the initial value of the charge pump 40 during the build-up period. Accordingly, the output voltage of the charge pump 40 rises in a short period of time and the build-up period may be shortened as a result.

While the exemplary embodiments of the invention have been explained in detail above, the specific structures and systems of the invention are not limited to the present exemplary embodiments and include also design changes and applications to other systems within a scope not deviating from the subject matter of the invention. For instance, although the DC/DC converter of the present exemplary embodiments have been constructed by the charge pumps of three stages, it is within a scope that can be readily thought of by the person skilled in the art to extend to a structure composed of charge pumps of four stages or more.

What is claimed is:

1. A charge pump-type DC/DC converter, comprising:
   a plurality of stages of charge pumps connected in series,
      wherein a charge pump in each stage outputs a voltage that is a multiple of a reference voltage and includes
      a capacitor that alternately repeats a charging period and a boosting period,
      a first transistor that turns ON during the charging period and turns OFF during the boosting period, and
      a second transistor that turns OFF during the charging period and turns ON during the boosting period;
   a driving circuit, operated by a first output voltage of a first charge pump of an initial stage, that generates driving signals for driving the first and the second transistors within the first charge pump; and
   a third transistor that turns ON when a second output voltage of a second charge pump, which is any one of the charge pumps at or after a second stage, is low to provide the reference voltage to a first output terminal of the first charge pump, and turns OFF when the second output voltage is high to disconnect the reference voltage from the first output terminal,
   wherein an output voltage of a charge pump of a final stage is applied to substrates of the first and second transistors of the charge pumps at and after the second stage.

2. The charge pump-type DC/DC converter according to claim 1, further comprising a fourth transistor that turns ON when the second output voltage of the second charge pump is low to provide the first output voltage to a second output terminal of the second charge pump, and turns OFF when the second output voltage is high to disconnect the first output voltage from the second output terminal.

3. A charge pump-type DC/DC converter, comprising:
   a plurality of stages of charge pumps connected in series,
      wherein a charge pump in each stage outputs a voltage that is a multiple of a reference voltage and includes
      a capacitor that alternately repeats a charging period and a boosting period,
      a first transistor that turns ON during the charging period and turns OFF during the boosting period, and
      a second transistor that turns OFF during the charging period and turns ON during the boosting period;
   a driving circuit, operated by a first output voltage of a first charge pump of an initial stage, that generates driving signals for driving the first and the second transistors within the first charge pump; and
   a third transistor that is switched responsive to a second output voltage of a second charge pump to be ON when the second output voltage is low to provide the reference voltage to a first output terminal of the first charge pump, and to be OFF when the second output voltage is high to disconnect the reference voltage from the first output terminal, the second charge pump is any one of the charge pumps at or after a second stage,
   wherein an output voltage of a charge pump of a final stage is applied to substrates of the first and second transistors of the charge pumps at and after the second stage.

4. A charge pump-type DC/DC converter, comprising:
   a plurality of stages of charge pumps connected in series,
      wherein a charge pump in each stage outputs a voltage that is a multiple of a reference voltage and includes
      a capacitor that alternately repeats a charging period and a boosting period,
      a first transistor that turns ON during the charging period and turns OFF during the boosting period, and
      a second transistor that turns OFF during the charging period and turns ON during the boosting period;

a driving circuit, operated by a first output voltage of a first charge pump of an initial stage, that generates driving signals for driving the first and the second transistors within the first charge pump; and a third transistor that is switched responsive to a second output voltage of a second charge pump to be ON when the second output voltage is low to provide the reference voltage to a first output terminal of the first charge pump, and to be OFF when the second output voltage is high to disconnect the reference voltage from the first output terminal, the second charge pump is any one of the charge pumps at or after a second stage, wherein the first output voltage is applied to substrates of the first and second transistors of the first charge pump.

* * * * *